(12) United States Patent
John et al.

(10) Patent No.: US 12,477,379 B2
(45) Date of Patent: Nov. 18, 2025

(54) TEMPORARY PRIORITY ELEVATION FOR NON-HIGH PRIORITY ACCESS USERS

(71) Applicant: Verizon Patent and Licensing Inc., Basking Ridge, NJ (US)

(72) Inventors: Toby Varughese John, Murphy, TX (US); Anand Thakur, Plano, TX (US); Syed Saad Ali, Frisco, TX (US); Jonathan Daniel Bahta, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 698 days.

(21) Appl. No.: 17/504,591

(22) Filed: Oct. 19, 2021

(65) Prior Publication Data

US 2022/0182872 A1    Jun. 9, 2022

Related U.S. Application Data

(63) Continuation-in-part of application No. 17/115,203, filed on Dec. 8, 2020, now Pat. No. 11,343,793.

(51) Int. Cl.
| | |
|---|---|
| *H04W 28/24* | (2009.01) |
| *H04L 47/2408* | (2022.01) |
| *H04W 28/02* | (2009.01) |
| *H04W 76/10* | (2018.01) |

(52) U.S. Cl.
CPC ..... *H04W 28/0252* (2013.01); *H04L 47/2408* (2013.01); *H04W 76/10* (2018.02)

(58) Field of Classification Search
None
See application file for complete search history.

(56) References Cited

U.S. PATENT DOCUMENTS

| | | | | |
|---|---|---|---|---|
| 10,862,805 | B1* | 12/2020 | Dods | .................... H04L 47/2483 |
| 2018/0295556 | A1* | 10/2018 | Baek | ........................ H04W 8/26 |

FOREIGN PATENT DOCUMENTS

CN    104125607    10/2014

* cited by examiner

*Primary Examiner* — Gary Lafontant

(57) ABSTRACT

Systems and methods establish and maintain end-to-end priority of wireless multimedia priority service (MPS) sessions terminating to subscribers without high priority access. A network device a wireless core network receives a request to establish a bearer for an elevated priority call. The elevated priority call originates from a first user equipment (UE) device in a Radio Resource Control (RRC) connected mode having an elevated priority status and terminates at a second UE device in a RRC connected mode having a non-elevated priority status. The network device determines modification of a terminating bearer for the second UE device is necessary to preclude preemption during periods of network congestion and identifies a high priority parameter of an originating bearer for the first UE device. The network device initiates establishment of the terminating bearer to match the high priority parameter of the originating bearer.

20 Claims, 13 Drawing Sheets

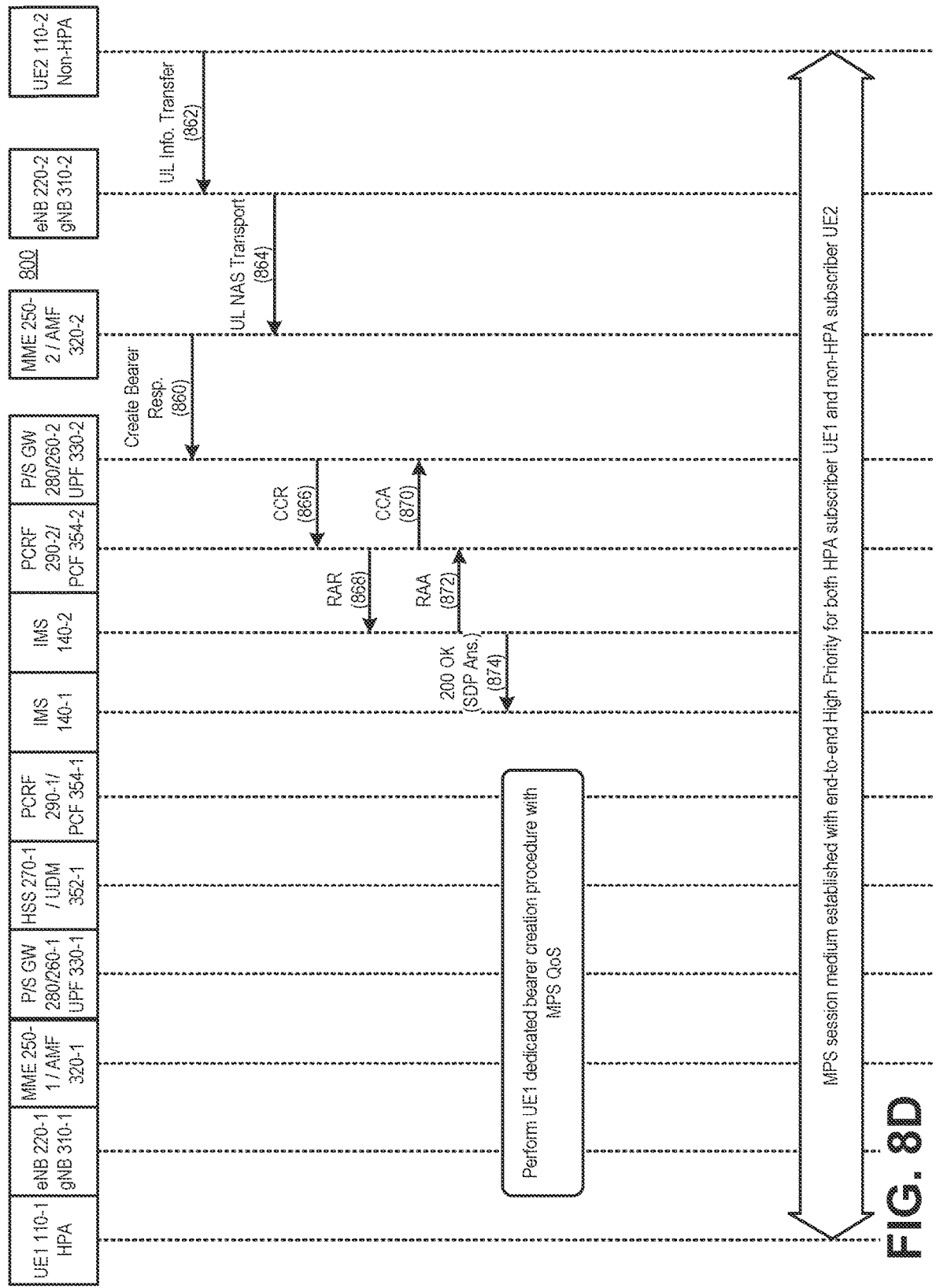

TEMPORARY PRIORITY ELEVATION FOR NON-HIGH PRIORITY ACCESS USERS

This application is a continuation-in-part of U.S. patent application Ser. No. 17/115,203, filed on Dec. 8, 2020, and titled "Paging Priority and Wireless Access for Non-High Priority Access Users During Wireless Network Congestion," the contents of which are incorporated herein by reference.

BACKGROUND

Long Term Evolution (LTE) is an existing mobile telecommunications standard for wireless communications. Next Generation wireless networks, such as Fifth Generation (5G) networks, provide increased capacity and speed. Both LTE and 5G networks will communicate with increasing numbers of Internet of Things (IoT) and user equipment (UE) devices. Providing wireless priority services for national security and emergency preparedness, and for public safety subscribers, can present challenges as increasing numbers of UE devices can create congestion in radio access networks.

BRIEF DESCRIPTION OF THE DRAWINGS

FIGS. 8A-8D are diagrams showing exemplary message flows within a wireless communication system for a terminating non-HPA UE device in RRC-connected mode to receive temporary admission priority.

DETAILED DESCRIPTION OF EXAMPLE EMBODIMENTS

Figure 1:
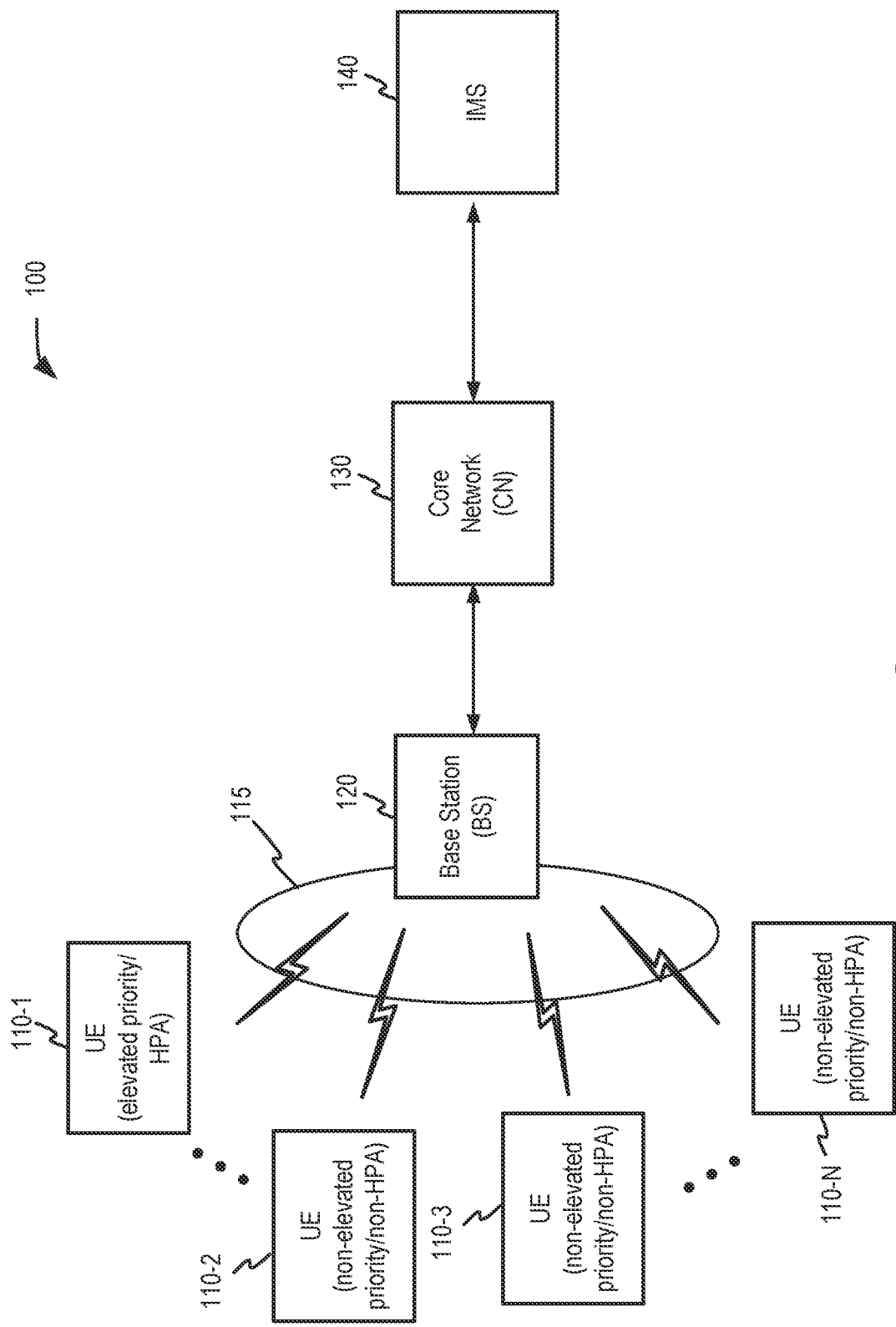
FIG. 1 is a diagram illustrating an example wireless communication system consistent with an embodiment.

The following detailed description refers to the accompanying drawings. The same reference numbers in different drawings may identify the same or similar elements. The following detailed description does not limit the scope of the invention.

Telecommunication advancements have led to increases in the numbers and utilization of User Equipment (UE) devices, including mobile communication handsets (e.g., smart phones) and Internet of things (IoT) devices. The increasing number of devices exchanging data with wireless networks can present risks affecting the performance and availability of different services. During an emergency and/or periods of high use, access to wireless connectivity may become restricted due to congestion on the wireless channels, and thus impact public safety and/or security.

For example, network operators in the United States currently support elevated priority services for National Security and Emergency Preparedness (NS/EP) and Public Safety subscribers, which include voice, data and other wireless communication services. Design and feature implementations deployed in many networks provide priority to NS/EP subscribers over normal users in the radio access network (RAN), evolved packet core (EPC), and in Internet Protocol multimedia systems (IMS). The access point for the UE devices, which is the RAN, is the most susceptible part of the system to network overload (also referred to herein as "congestion"). Although many RAN advancements have improved accessibility for NS/EP subscribers during an emergency or crisis, accessibility and capacity bottlenecks remain an issue for critical services.

Elevated priority services, which may include high priority services such as, for example, multimedia priority services (MPS), NS/EP services, and Public Safety services, may be subscribed services for prioritized accessibility to a cellular network. Third generation partnership project (3GPP) standards and network operators define access requirements for high priority subscribers to gain access to a cellular network in a crisis event where networks are congested. As used herein, the term "High Priority Access (HPA) subscribers" may refer to subscribers and/or their corresponding UE devices that have subscriptions for elevated priority services. Also as used herein, the term "non-HPA subscribers" may refer to subscribers and/or their corresponding UE devices that do not have subscriptions for elevated priority services. Sessions designated for high priority services may be collectively referred to herein as "MPS sessions."

Current standards specifications, operator requirements, and implementations present the following problem. During an emergency and network congestion scenario, when an HPA subscriber, such as a MPS or Public Safety subscriber, directs (e.g., terminates) a priority voice, data, or messaging connection (e.g., a call) to a non-HPA subscriber (e.g., having normal priority), the connection may fail since no priority mechanisms are in place from the network or the responding device. Furthermore, when a session between an HPA subscriber and non-HPA subscriber is established, the ongoing session may be subject to preemption during subsequent network congestion because the non-HPA subscriber would not have prioritized accessibility. In other words, unless the ongoing session has end-to-end priority treatment, the session may be terminated due to network congestion.

Embodiments presented herein provide and maintain priority of wireless MPS sessions terminating to non-HPA subscribers. In one aspect, the non-HPA subscriber may be in a Radio Resource Control (RRC)-idle state and receive a Priority Paging message. The UE device may decode the received information, temporarily elevate its priority status to increase accessibility to the network and session, and respond to the RAN with a RRC Connection Request designating an elevated priority (such as, for example, an access class (AC) or Access Identity (AI) designating "High Priority Access." The RAN may receive the RRC Connection Request from the non-HPA subscriber and treat the request according to the higher access class that is not vulnerable to barring during network congestion.

In another aspect, an HPA subscriber may initiate an MPS session with a non-HPA-subscriber that is in an RRC-connected state (e.g., such that a paging message is not required to establish the MPS session). The core network may identify a high priority indicator in the bearer information for the session and trigger a bearer update process. As a result of the bearer update process, the RAN element may elevate the priority of the non-HPA subscriber to designate "High Priority Access" and provide a quality of service (QoS) that corresponds to that of the originator's HPA subscription for the duration of the MPS session. As a result, the MPS session may be treated end-to-end with the priority level of the HPA subscriber.

FIG. 1 is a diagram illustrating an exemplary wireless communication system 100 consistent with an embodiment. As shown in FIG. 1, environment 100 may include UE devices 110-1 to 110-N (referred to herein plurally, but not necessarily collectively or in their entirety, as "UE devices 110", and individually as "UE device 110-x"), a base station (BS) 120, a core network (CN) 130, and an IP multimedia subsystem (IMS) 140. UE devices 110 may communicate over wireless channels with BS 120 via RAN 115 using any type of known cellular network, such as, for example, LTE, LTE Advanced, 5G, etc. UE devices 110 may exchange data with CN 130 via BS 120 through one or more dedicated channels having varying levels of priority. In the example shown in FIG. 1, UE device 110-1 may have an elevated priority status (e.g., HPA) and UE devices 110-2 through 110-N may have a non-elevated priority status (e.g., non-HPA). CN 130 may further exchange data with IMS 140 via a backhaul network (not shown). Accordingly, through BS 120 and CN 130, UE devices 110 may obtain access to IMS 140 for exchanging Internet Protocol (IP) data using any application protocol, such as session initiation protocol (SIP).

Referring to FIG. 1, UE devices 110 may include any device with long-range (e.g., cellular or mobile wireless network) wireless communication functionality. For example, UE devices 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer, or a digital media player (e.g., Apple TV®, Google Chromecast®, Amazon Fire TV®, etc.); a smart television; a portable gaming system; a global positioning system (GPS) device; a home appliance device; a home monitoring device; and/or any other type of computer device with wireless communication capabilities and a user interface. UE device 110 may also include any type of customer premises equipment (CPE) such as a set top box, a wireless hotspot (e.g. an LTE or 5G wireless hotspot), a femto-cell, etc. UE device 110 may include capabilities for voice communication, mobile broadband services (e.g., video streaming, real-time gaming, premium Internet access etc.), best effort data traffic, and/or other types of applications.

In some implementations, UE devices 110 may communicate using machine-to-machine (M2M) communication, such as machine-type communication (MTC), a type of M2M communication standardized by the 3GPP, and/or another type of M2M communication. UE devices 110 may be embodied as IoT devices, which may include health monitoring devices, asset tracking devices (e.g., a system monitoring the geographic location of a fleet of vehicles, etc.), sensors (e.g., utility sensors, traffic monitors, etc.).

UE devices 110 may be in various states of connection with BS 120 via RAN 115. For example, some UE devices 110 may have radio connections in an active state (e.g., RRC-connected) where data may be exchanged, and other UE devices 110 may have idle radio connections (e.g., RRC-idle). Thus, when in RRC-idle mode, UE device 110 does not have an active communication path to RAN 115 or CN 130. Paging procedures address this issue by alerting or paging the idle UE device 110 to re-establish a radio connection and bearer path with the wireless network. The 3GPP Technical Specification 36.413 defines an attribute for CN 130 elements, such as the 4G mobility management entity (MME) or 5G access and mobility management function (AMF) used to prioritize a paging message of an RRC idle UE device. Within a paging message sent from CN 130 to RAN 115, a paging priority parameter may indicate the priority of the paging message. The paging priority parameter may have, for example, eight defined levels. Critical subscribers (also referred to herein as "elevated priority subscribers" or "HPA subscribers") such as, for example, first responders, public utilities, law enforcement or other government entities can utilize available critical priority services (such as, for example, mission critical push to talk (MC-PTT), data, messaging and/or multimedia priority services (MPS)) on a subscribed basis.

In conventional networks, paging priority may work as expected if the originating and terminating parties are both subscribed to critical services. When an originating HPA subscriber calls a non-HPA subscriber, a paging message which originates at the MME or AMF (e.g., of CN 130) will still have the paging priority indicator. However, due to current standards and implementation, the base station 120 may remove the paging priority indicator before sending the paging message to the non-HPA priority UE device 110. During network congestion, critical subscribers in the field may be required to communicate to non-HPA (e.g., "normal") subscribers. When an HPA subscriber originates an elevated priority call to an RRC-idle non-HPA subscriber, the paging message may be delivered. In response to the paging message, the non-HPA subscriber attempts to connect to the congested cell using a non-HPA status and the call will likely fail since the RAN is in a congested state. This results in a communication failure for a critical service user such as MPS or First Responder agents in the field. Furthermore, in conventional networks, a non-HPA UE device 110 may be in an RRC active state when an MPS call is terminated to the non-HPA UE device 110. No priority paging message is needed to establish the MPS session when non-HPA UE device 110 is in an active state. Thus, the ongoing MPS session may be vulnerable to preemption during network congestion because the non-HPA UE device 110 does not have prioritized access.

Embodiments described herein may address connection and session vulnerability issues, for MPS sessions terminating to non-HPA subscribers in congested network conditions, with the following approaches. In one embodiment, RAN 115 (e.g., base station 120) may propagate paging information to a non-HPA UE device 110 which is the recipient of a paging message having elevated priorities (e.g., herein referred to as a "priority paging message"). Upon receiving the priority paging message, non-HPA UE device 110 may decode the received information, temporarily elevate the priority status of non-HPA UE device 110 to increase accessibility to the network and session, and respond to RAN 115 with an RRC Connection Request designating an elevated priority (such as, for example, an establishment cause designating "highPriorityAccess" (HPA)). In another embodiment, CN 130 may recognize that a MPS session is requested with a terminating non-HPA UE device 110 in an RRC-connected mode. Devices in CN 130 may trigger a bearer update procedure and RAN 115 may reconfigure the RRC connection with non-HPA UE device 110 to temporarily designate an elevated priority for the bearer.

BS 120 and CN 130 provide access to IMS 140 for providing multimedia IP services to UE devices 110. Such services may include mobile voice service (e.g., various forms of voice over Internet Protocol (VoIP)), short message service (SMS), multimedia message service (MMS), multimedia broadcast multicast service (MBMS), Internet access, cloud computing, and/or other types of data services. While not shown, BS 120 and CN 130 may further provide additional access to a wide area network (WAN, not shown) for other IP and/or non-IP data delivery (NIDD) services.

In some implementations, BS 120 and CN 130 may include Long Term Evolution (LTE) and/or LTE Advance (LTE-A) capability, where BS 120 may include as an eNodeB, and CN 130 may include as an evolved packet core (EPC) network. Alternatively, in other implementations, BS 120 and CN 130 may include 5G access capability, where BS 120 may include a next generation Node B (gNodeB), and CN 130 may serve as a 5G packet core (5G PC) network. Such implementations may include functionality such as 5G new radio (NR) base stations; carrier aggregation; advanced or massive multiple-input and multiple-output (MIMO) configurations; heterogeneous networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology.

IMS 140 may include one or more devices, such as computer devices, databases, and/or server devices, that facilitate IP data delivery services. Such services may include supporting IoT applications such as alarms, sensors, medical devices, metering devices, smart home devices, wearable devices, retail devices, etc. Other services may include supporting other communications applications (e.g., SMS, etc.), automotive applications, aviation applications, etc. IMS 140 may communicate with UE devices 110 over BS 120 and CN 130 using IP and/or non-IP bearer channels.

Although FIG. 1 shows exemplary components of wireless communication system 100, in other implementations, wireless communication system 100 may include fewer components, different components, differently arranged components, or additional components than depicted in FIG. 1. Additionally or alternatively, one or more components of wireless communication system 100 may perform functions described as being performed by one or more other components of wireless communication system 100.

Figure 2:
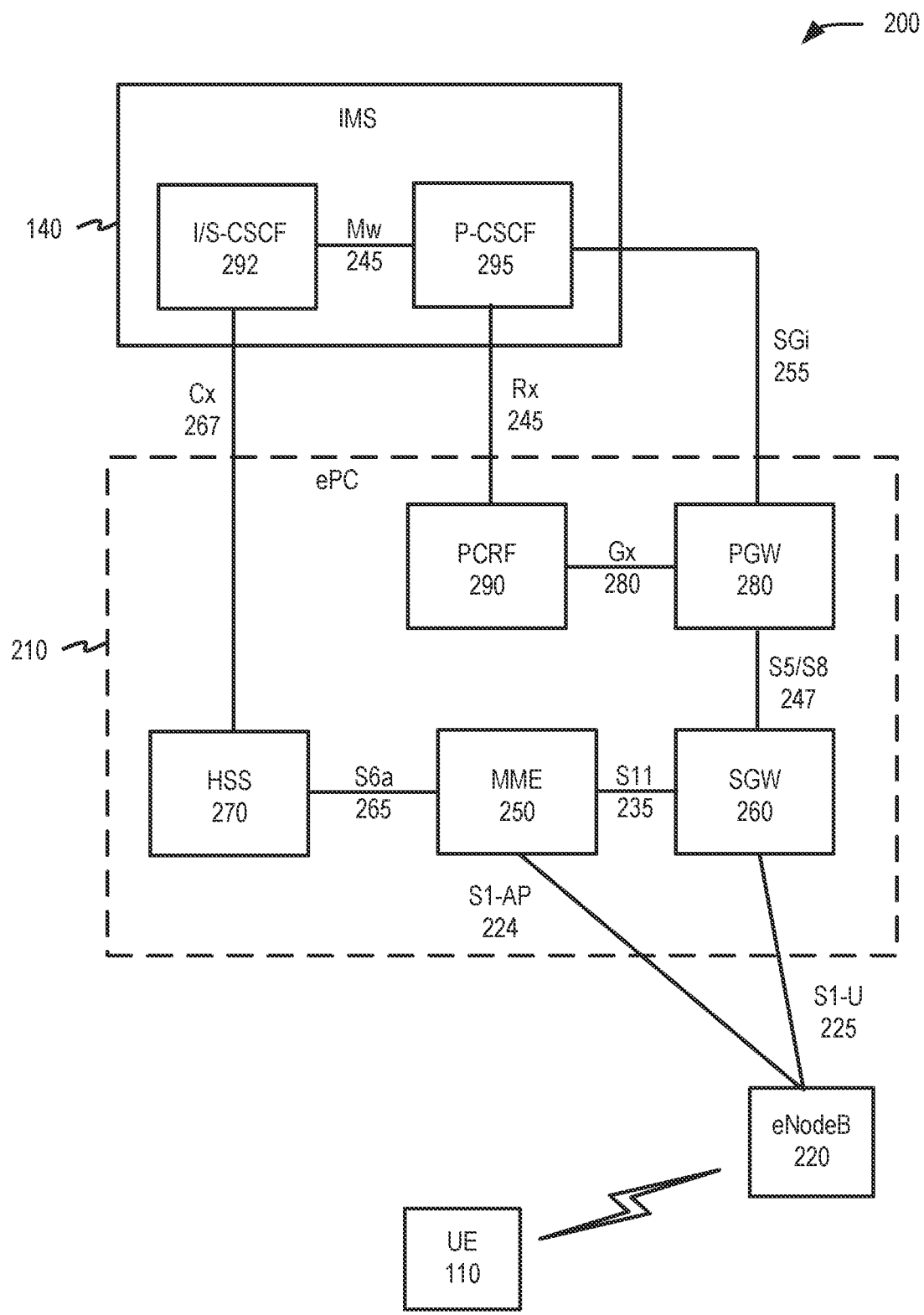
FIG. 2 is a block diagram of an exemplary wireless communication system having a radio access network based on an LTE standard.

FIG. 2 is a block diagram of an exemplary wireless communication system 200 based on the LTE standard. Wireless communication system 200 may include an LTE network with an evolved Packet Core (ePC) 210 and eNodeB 220 (corresponding, for example, to portions of CN 130 and BS 120, respectively). UE device 110 and eNodeB 220 may exchange data over a radio access technology (RAT) based on LTE air channel interface protocols. In the embodiment shown in FIG. 2, EPC 210 may operate in conjunction with an evolved Universal Mobile Telecommunications System (UMTS) Terrestrial Network (eUTRAN) that includes at least one eNodeB 220. Wireless communication system 200 may further include an IP network and/or a non-IP network. Such networks may be embodied separately or included in a backhaul network and/or in a wide area network (not shown). EPC 210 may also be connected to subsystems in IMS 140.

EPC 210 may include one or more devices that are physical and/or logical entities interconnected via standardized interfaces. EPC 210 provides wireless packet-switched services and wireless packet connectivity to UE devices 110 to provide, for example, data, voice, and/or multimedia services. EPC 210 may further include a mobility management entity (MME) 250, a serving gateway (SGW) 260, a home subscriber server (HSS) 270, a packet data network gateway (PGW) 280, and a Policy and Charging Rules Function (PCRF) 290. It is noted that FIG. 2 depicts a representative networking system 200 with exemplary components and configuration shown for purposes of explanation. Other embodiments may include additional or different network entities in alternative configurations than which are exemplified in FIG. 2. For example, IMS 140 may communicate with ePC 210, and include various call session control functions (CSCFs), which may include interrogating/serving CSCF 292 (I/S CSCF), and proxy CSCF (P-CSCF) 295. I/S-CSCF 292 and P-CSCF 295 may exchange information using an Mw interface 245 using SIP.

Further referring to FIG. 2, eNodeB 220 may include one or more devices and other components having functionality that allows UE device 110 to wirelessly connect via the RAT of eNodeB 220. eNodeB 220 may interface with ePC 210 via a S1 interface, which may be split into a control plane S 1-AP interface 224 and a data plane S1-U interface 225. ENodeB 220 may interface with MME 250 via S 1-AP interface 224, and interface with SGW 260 via S1-U interface 225. S1-U interface 225 may be implemented, for example, using GTP. S 1-AP interface 224 may be implemented, for example, with a protocol stack that includes a Non-Access Stratum (NAS) protocol and/or Stream Control Transmission Protocol (SCTP).

MME 250 may implement control plane processing for both the primary access network and the secondary access network. For example, through eNodeB 220, MME 250 may implement tracking and paging procedures for UE device 110, may activate and deactivate bearers for UE device 110, and may authenticate a user of UE device 110 to provide normal coverage service for operating in normal UE device mode. MME 250 may also select a particular SGW 260 for a particular UE device 110. MME 250 may interface with other MMEs (not shown) in ePC 210 and may send and receive information associated with UE devices 110, which may allow one MME 250 to take over control plane processing of UE devices 110 serviced by another MME 250, if the other MME becomes unavailable.

MME 250 may communicate with SGW 260 through an S11 interface 235. S11 interface 235 may be implemented, for example, using GTPv2. S11 interface 235 may be used to create and manage a new session for a particular UE device 110. S11 interface 235 may be activated when MME 250 needs to communicate with SGW 260, such as when the particular UE device 110 attaches to ePC 210, when bearers need to be added or modified for an existing session for the particular UE device 110, when a connection to a new PGW 280 needs to be created, or during a handover procedure (e.g., when the particular UE device 110 needs to switch to a different SGW 260).

SGW 260 may provide an access point to and from UE device 110, may handle forwarding of data packets for UE device 110, and may act as a local anchor point during handover procedures between eNodeBs 220. SGW 260 may interface with PGW 280 through an S5/S8 interface 247.

HSS 270 may store information associated with UE device 110 and/or information associated with users of UE device 110. For example, HSS 270 may store user profiles that include registration, authentication, and access authorization information. MME 250 may communicate with HSS 270 through an S6a interface 265. S6a interface 265 may be implemented, for example, using a Diameter protocol. HSS 270 may communicate with I/S CSCF 292 within IMS 140 via a Cx interface 267.

PGW 280 may function as a gateway to IMS 140 through an SGi interface 255. IMS 140 may provide various services (e.g., IP over multimedia services such over the top voice services) to UE device 110. A particular UE device 110, while connected to a single SGW 260, may be connected to multiple PGWs 280, one for each packet network with which UE device 110 communicates. PGW 280 may exchange information with P-CSCF 295 using the SGi interface 255 based on TCP/IP.

Alternatively, UE device 110 may exchange data with IMS 140 though a WiFi wireless access point (WAP) (not shown). The WiFi WAP may be part of a local area network and access IMS 140 through a wired connection via a router. Alternatively, the WiFi WAP may be part of a mesh network (e.g., an IEEE 802.11s network). The WiFi WAP may operate in accordance with any type of WiFi standard (e.g., any IEEE 802.11x network, where x=a, b, c, g, and/or n), and/or include any other type of wireless network technology for covering larger areas, and may include a mesh network and/or or a WiMAX network.

PCRF 290 provides policy control decision and flow-based charging control functionalities. PCRF 290 may provide network control regarding service data flow detection, gating, QoS and flow based charging, etc. PCRF 290 may determine how a certain service data flow shall be treated, and may ensure that user plane traffic mapping and treatment are in accordance with a user's subscription profile based, for example, on a specified QoS class identifier (QCI). PCRF 290 may communicate with PGW 280 using a Gx interface 280. PCRF 290 may also interface to P-CSCF 295 using an Rx interface 245.

Figure 3:
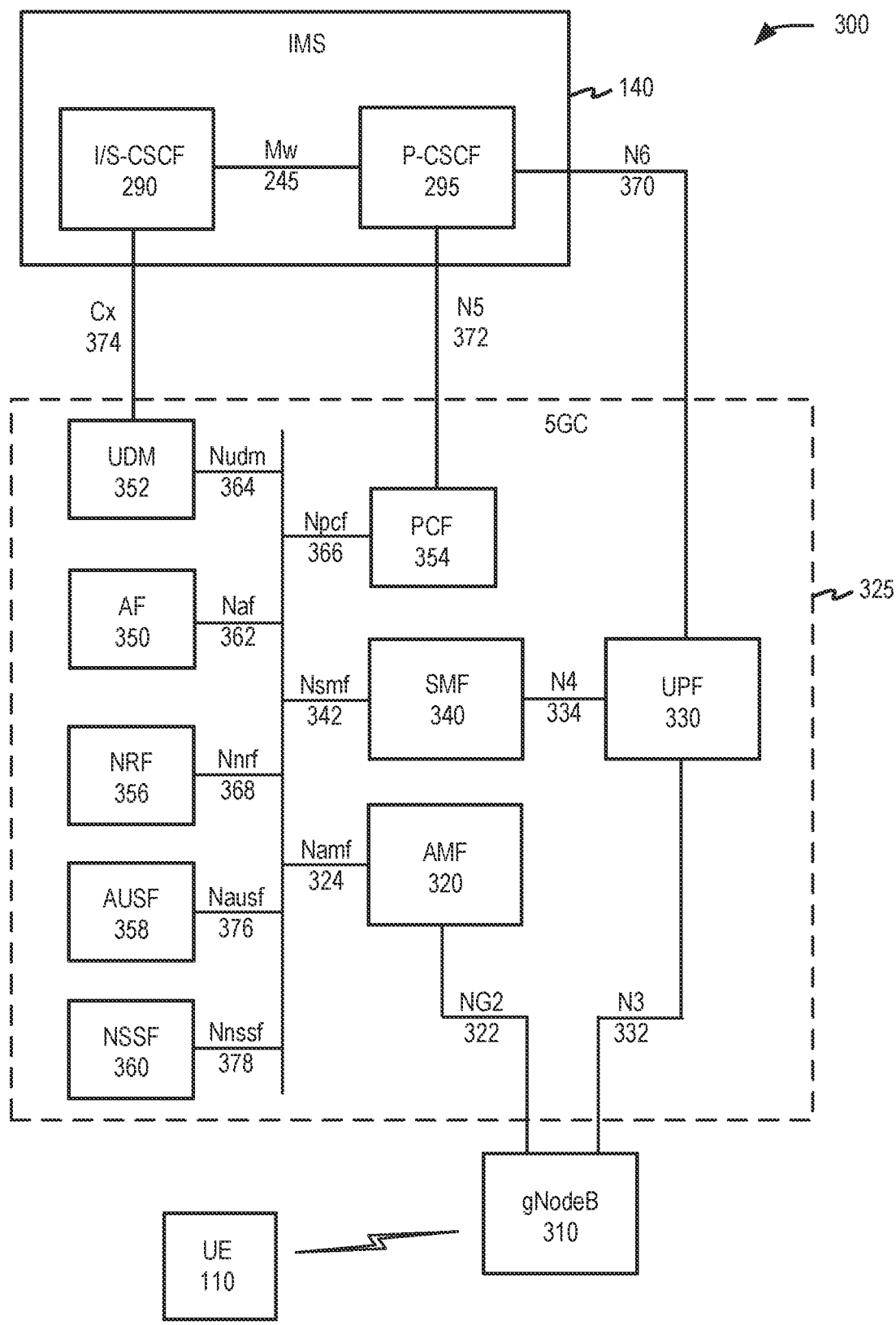
FIG. 3 is a block diagram of an exemplary wireless communication system having a radio access network based on a 5G standard.

FIG. 3 is a block diagram of an exemplary wireless communication system 300 having a radio access network based on a 5G standard. Wireless communication system 300 may include an 5G network with a 5G Core (5GC) 325, gNodeB 310 (corresponding, for example, to portions of CN 130 and BS 120, respectively), UE device 110, and IMS 140. UE device 110 and gNodeB 310 may exchange data over a RAT based on 5G air channel interface protocols. Wireless communication system 300 may further include an IP network and/or a non-IP network, which may be embodied separately or included in a backhaul network and/or in a wide area network (not shown). 5GC 325 may also be connected to subsystems in IMS 140. IMS 140 may include various CSCFs, I/S-CSCF 292 and/or P-CSCF 295, which may exchange information via Mw interface 245 using SIP.

5GC 325 may include an Access and Mobility Function (AMF) 320, a User Plane Function (UPF) 330, a Session Management Function (SMF) 340, an Application Function (AF) 350, a Unified Data Management (UDM) 352, a Policy Control Function (PCF) 354, a Network Repository Function (NRF) 356, an Authentication Server Function (AUSF) 358, and a Network Slice Selection Function (NSSF) 360.

While FIG. 3 depicts a single gNodeB 310, AMF 320, UPF 330, SMF 340, AF 350, UDM 352, PCF 354, NRF 356, AUSF 358, and/or NSSF 360 for exemplary illustration purposes, in practice, FIG. 3 may include multiple gNodeBs 310, AMFs 320, UPFs 330, SMFs 340, AFs 350, UDMs 352, PCFs 354, NRFs 356, AUSFs 358, and NSSFs 360.

gNodeB 310 may include one or more device, components, and/or functionality that enable UE device 110 to wirelessly connect to 5GC 325 using 5G NR RAT. For example, gNodeB 310 may include one or more cells, with each cell site equipment including a wireless transceiver with an antenna array configured for millimeter-wave wireless communication. GNodeB 310 may implement one or more RAN slices to partition 5GC 325. GNodeB 310 may communicate with AMF 320 using an N2 interface 322 and communicate with UPF 330 using an N2 interface 332.

AMF 320 may perform registration management, connection management, reachability management, mobility management, lawful intercepts, Short Message Service (SMS) transport between UE device 110 and an SMS function (not shown in FIG. 3), session management messages transport between UE device 110 and SMF 340, access authentication and authorization, location services management, functionality to support non-3GPP access networks, and/or other types of management processes. In some implementations, AMF 320 may implement some or all of the functionality of managing RAN slices in gNodeB 310. AMF 320 may be accessible by other function nodes via a Namf interface 324.

UPF 330 may maintain an anchor point for intra/inter-RAT mobility, maintain an external Packet Data Unit (PDU) point of interconnect to a data network (e.g., WAN), perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a Radio Access Network (RAN) node (e.g., gNodeB 310), and/or perform other types of user plane processes. UPF 330 may communicate with SMF 340 using an N4 interface 334 and connect to IMS 140 using an N6 interface 370. UPF 330 may communicate with P-CSCF 295 using an N6 interface 370.

SMF 340 may perform session establishment, modification, and/or release, perform IP address allocation and management, perform Dynamic Host Configuration Protocol (DHCP) functions, perform selection and control of UPF 330, configure traffic steering at UPF 330 to guide traffic to the correct destination, terminate interfaces toward PCF 354, perform lawful intercepts, charge data collection, support charging interfaces, control and coordinate of charging data collection, termination of session management parts of network access stratum (NAS) messages, perform downlink data notification, manage roaming functionality, and/or perform other types of control plane processes for managing user plane data. SMF 340 may be accessible via an Nsmf interface 342.

AF 350 may provide services associated with a particular application, such as, for example, application influence on traffic routing, interacting with a policy framework for policy control, and/or other types of applications. AF 350 may be accessible via a Naf interface 362.

UDM 352 may maintain subscription information for UE device 110, manage subscriptions, generate authentication credentials, handle user identification, perform access authorization based on subscription data, perform network function registration management, maintain service and/or session continuity by maintaining assignment of SMF 340 for ongoing sessions, support SMS delivery, support lawful intercept functionality, and/or perform other processes associated with managing user data. UDM 352 may be accessible via a Nudm interface 364. UDM 352 may communicate with I/S-CSCF 290 through a Cx interface 374. Cx interface 374 may exchange data pertaining to, for example, user registration, authentication, location, and profile information.

PCF 354 may support policies to control network behavior, provide policy rules to control plane functions (e.g., to SMF 340), access subscription information relevant to policy decisions, execute policy decisions, and/or perform other types of processes associated with policy enforcement. PCF 354 may be accessible via Npcf interface 366. PCF 354 may specify QoS policies based on QoS flow identity (QFI) consistent with 5G network standards. PCF 354 may communicate with P-CSCF 295 via N5 interface 372. N5 interface 372 may exchange data pertaining to for example, QoS information, authorization, and retention priority information.

NRF 356 may support a service discovery function and maintain a profile of available network function (NF) instances and their supported services. An NF profile may include an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 356 may be accessible via an Nnrf interface 368.

AUSF 358 may be located within the home network and provide authentication services for UE device 110 and other security related functions for 5GC 325. AUSF 358 may authenticate UE device 110 using materials obtained through an Nudm authentication service while using the method specified by the service consumer. AUSF 358 may be accessible via an Nausf 376 service interface.

NSSF 360 may select a set of network slice instances to serve a particular UE device 110, determine network slice selection assistance information (NSSAI), determine a particular AMF 320 to serve a particular UE device 110, and/or perform other types of processes associated with network slice selection or management. In some implementations, NSSF 360 may implement some or all of the functionality of managing RAN slices in gNodeB 310. NSSF 360 may be accessible via Nnssf interface 378.

Although FIGS. 2 and 3 shows exemplary components of wireless communication systems, in other implementations, the wireless communication systems may include fewer components, different components, differently arranged components, or additional components than depicted in FIGS. 2 and 3. For example, in another implementation, one or more components of ePC 210 may be combined with one or more components of 5GC 325. Similarly, eNB 220 and gNB 310 may be combined in a single device configured to handle both 4G/LTE and 5G communications. Additionally or alternatively, one or more components of wireless communication systems 200/300 may perform functions described as being performed by one or more other components of wireless communication systems 200/300 and/or other types of functions.

Figure 4:
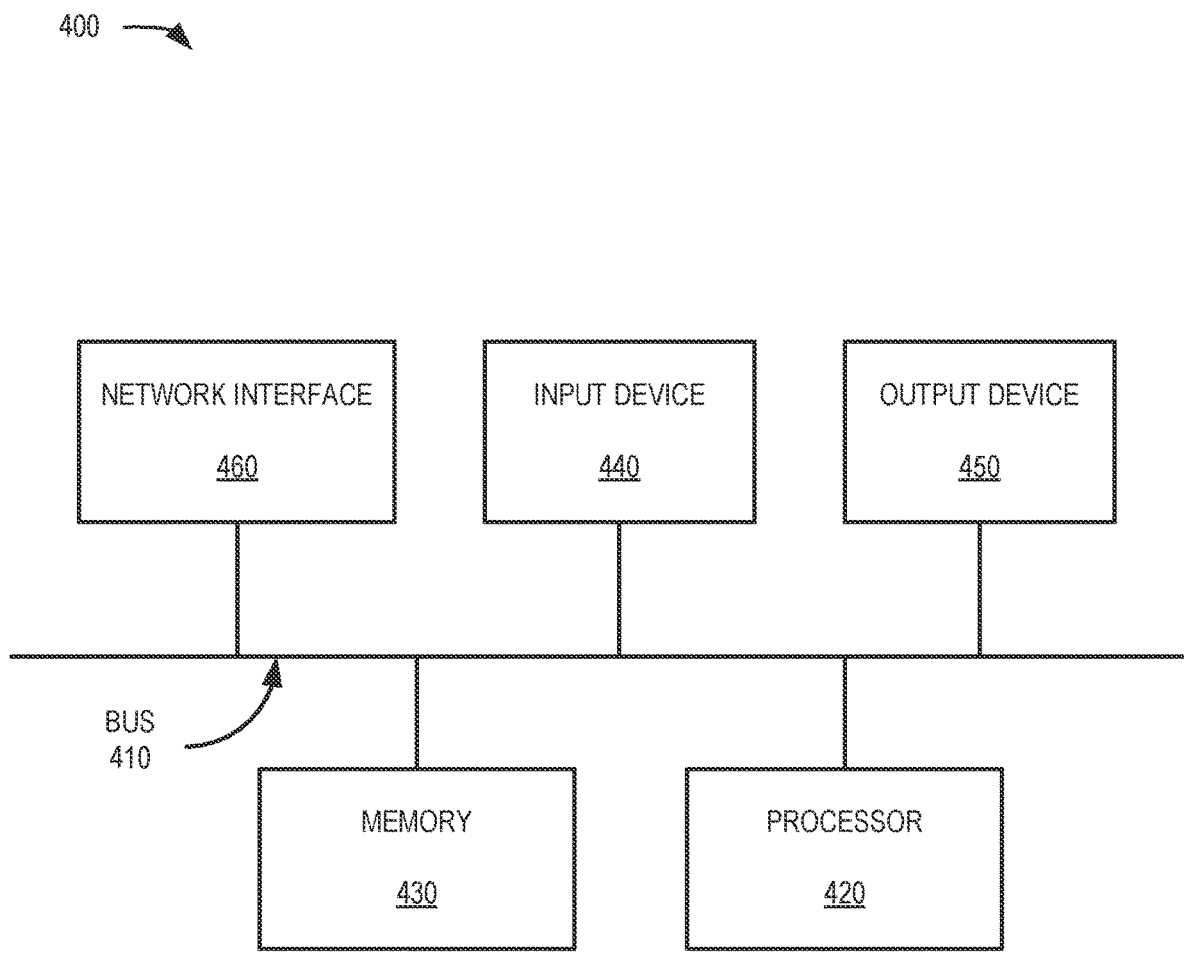
FIG. 4 is a block diagram showing exemplary components of a network device according to an embodiment.

FIG. 4 is a block diagram showing exemplary components of a device 400 according to an embodiment. Device 400 may include one or more network elements illustrated in FIGS. 2-3 such as, for example, a UE device 110, a base station 120 (e.g., eNodeB 220 and/or gNodeB 310), elements in ePC 210, elements in 5GC 325, etc. In some embodiments, there may be a plurality of devices 400 providing functionality of one or more network elements. Alternatively, once device 400 may perform the functionality of any plurality of network elements. Device 400 may include a bus 410, a processor 420, a memory 430, input device 440, and an output device 450, and a network interface 460.

Bus 410 includes a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system, which may include varieties of the Windows, UNIX, and/or Linux operating systems. Processor 420 may also use high-level analysis software packages and/or custom software written in any programming and/or scripting languages for interacting with other network entities.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read only memory (ROM) device or another type of static storage device, and/or a removable form of memory, such as a flash memory. In other implementations, memory 430 may include any type of on-board device suitable for storing large amounts of data, and may include one or more hard drives, solid state drives, and/or various types of redundant array of independent disks (RAID) arrays. In an embodiment, memory 430 may store profile data associated with UE devices 110. Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. Output device 450 may output information to an operator of device 400. Output device 450 may include a display, a printer, a speaker, and/or another type of output device.

Network interface 460 may include a transceiver that enables network device 150 to communicate with other devices and/or systems in wireless communication system 100. Network interface 460 may be configured to exchange data over wired communications (e.g., conductive wire, twisted pair cable, coaxial cable, transmission line, fiber optic cable, and/or waveguide, etc.), or a combination of wired and wireless communications. In other embodiments, network interface 460 may interface with other devices using a wireless communications channel, such as, for example, radio frequency (RF), infrared, and/or visual optics, etc. Network interface 460 may include a transmitter that converts baseband signals to RF signals and/or a receiver that converts RF signals to baseband signals. Network interface 460 may be coupled to one or more antennas for transmitting and receiving RF signals. Network interface 460 may include a logical component that includes input and/or output ports, input and/or output systems, and/or other input and output components that facilitate the transmission/reception of data to/from other devices. For example, network interface 460 may include a network interface card (e.g., Ethernet card) for wired communications and/or a wireless network interface (e.g., a WiFi) card for wireless communications. Network interface 460 may also include a universal serial bus (USB) port for communications over a cable, a Bluetooth® wireless interface, a radio frequency identification device (RFID) interface, a near field communications (NFC) wireless interface, and/or any other type of interface that converts data from one form to another form.

As described below, device 400 may perform certain operations for providing access, admission, and treatment of MPS sessions terminating to non-HPA subscribers. Device 400 may perform these operations in response to processor 420 executing software instructions contained in a computer-readable medium, such as memory 430. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software. In an embodiment, the software instructions and/or hardware circuitry may perform the process exemplified by the flow charts shown in FIGS. 5, 7, and 9 and the signal flows shown in FIGS. 6A-6B, and FIGS. 8A-8D.

Although FIG. 4 shows exemplary components of device 400, in other implementations, device 400 may include fewer components, different components, additional components, or differently arranged components than depicted in FIG. 4.

Figure 5:
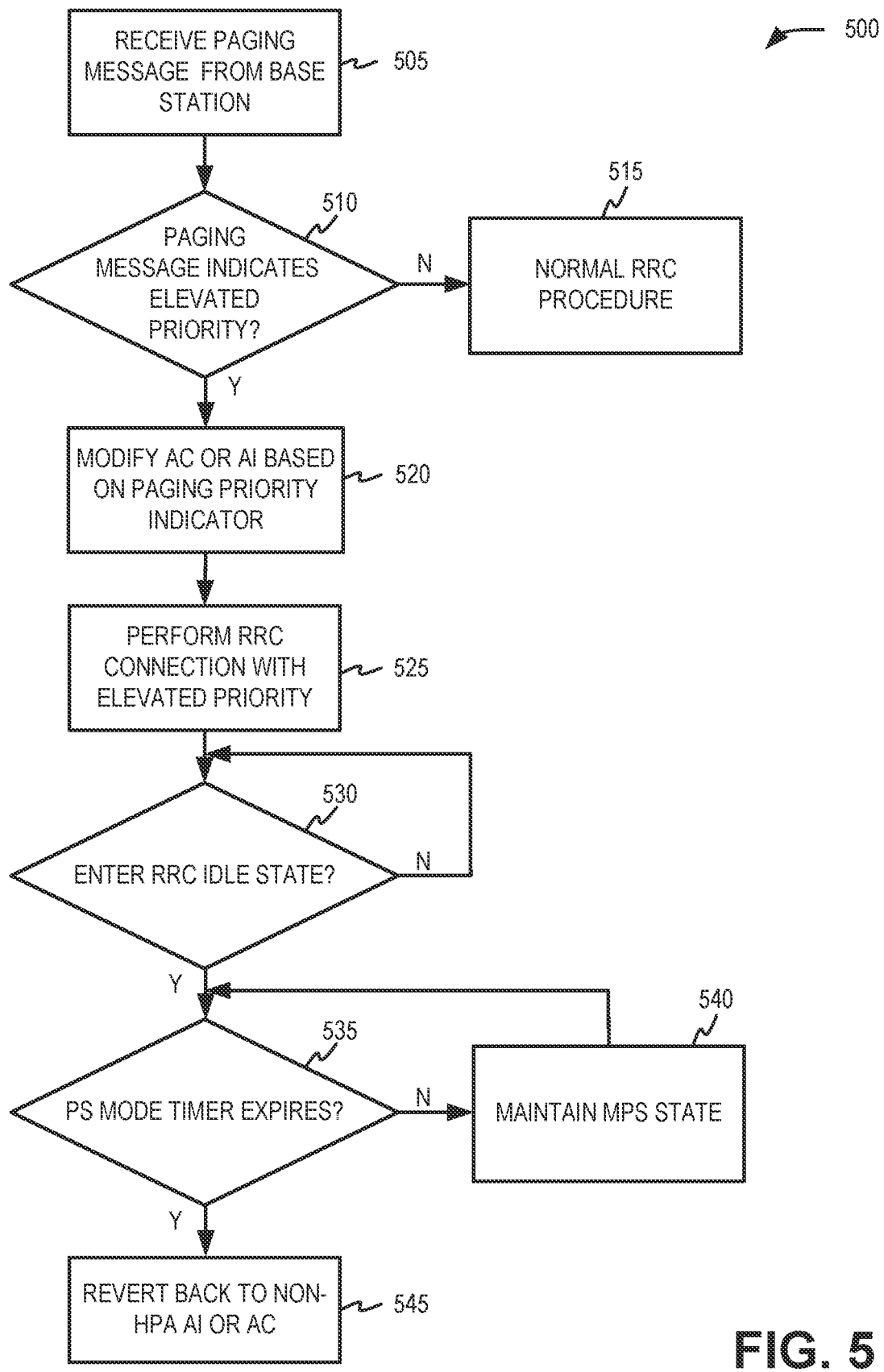
FIG. 5 is a flow chart of an exemplary process for a terminating non-high priority access (HPA) UE device in Radio Resource Connection (RRC)-idle mode to receive temporary admission priority.

FIG. 5 is a flow chart of an exemplary process 500 for a terminating non-HPA UE device in RRC-idle mode to receive temporary RAN admission priority during wireless network congestion. In an embodiment, process 500 may be performed by a non-HPA subscriber, such as UE device 110-2. In other embodiments process 500 may be performed by UE device 110-2 in conjunction with a device 400, such as base station 120.

Initially, a non-HPA UE device 110-2 may receive, from base station 120, a paging message associated with a priority connection from elevated priority UE device 110-1 (block 505). For example, HPA UE device 110-1 may initiate a priority connection to a non-HPA UE device 110-2 that is in a RRC idle mode, which may cause CN 130 to generate a paging message. The paging message may be directed to non-elevated priority UE device 110-2 via base station 120. Since the terminating user (UE device 110-2) is a non-HPA subscriber, UE device 110-2 does not have the 5G Access Identity (AI) of 1-2, 11-15 or in 4G, the Special Access Class 11-15. As noted above, HPA UE device 110-1 may be associated with an elevated priority service, and the paging message may be a priority paging message that includes a paging priority parameter. The elevated priority service may be a high priority service that can include a MPS, a public safety service, a national security service, an emergency preparedness service, etc. In an embodiment, the paging priority parameter may be indicated in a single bit in the paging message.

UE device 110-2 may determine whether the paging message includes a paging priority indicator (designating an elevated priority, such as, for example, HPA) (block 510). For example, UE device 110-2 may be configured to identify whether the paging message includes the paging priority parameter. If UE device 110-2 determines paging messages does not have a paging priority indicator (block 510—no), UE device 110-2 may perform a normal RRC procedure (block 515). For example, UE device 110-2 may respond to the paging message by submitting a RRC connection request as a non-HPA subscriber.

Alternatively, if UE device 110-2 determines the paging message includes a paging priority indicator (block 510—yes), UE device 110-2 may modify the access class or access identity (block 520). For example, upon reception of the priority paging message, the UE device 110-2 may update the Access Control Class (ACC) Elementary File (EF) defined from the current AI/AC to a corresponding determined AI/AC value based on the paging priority indicator to transition into a "Public Safety mode" or "PS mode." According to an implementation, UE device 110-2 may update a universal subscriber identity module (USIM) ACC to AI 1, 2 or 11-15 (for 5G) or AC 11-15 (for 4G).

UE device 110-2 may then send a RRC connection request with elevated priority to RAN 115 (block 525). For example, UE device 110-2 may generate and send a RRC connection request to base station 120. The RRC connection request may include the elevated status indicator (e.g., for HPA status). Base station 120 may receive the RRC connection request with the HPA status, admit UE device 110-2, and temporally elevate UE device 110-2 to elevated priority status (e.g., HPA) prior to establishing a call session.

UE device 110-2 may maintain the elevated AI and special AC while UE device 110-2 so long as UE device 110-2 does not enter an idle state (block 530—no). When the session between UE device 110-2 and the HPA UE device (e.g., UE device 110-1) ends, UE device 110-2 may transition from Evolved Packet Service (EPS) Connection Management to RRC-connected mode to RRC-idle state (block 530—yes). Upon entering the RRC idle state, UE device 110-2 may start a "PS mode timer." The PS mode timer may provide a preset time interval (e.g., configured by a network administrator) to hold an elevated priority level after entering an RCC idle state. Before the UE device's PS mode timer expires (block 535—no), UE device 110-2 may maintain a MPS state (block 540). When the UE device's "PS mode timer" has expired, the UE device 110-2 may monitor a secondary PS mode timer for each UE device and revert the access indicator and/or access class back to its original (non-HPA subscriber) value, thereby exiting the PS mode (block 545).

Figure 6A:
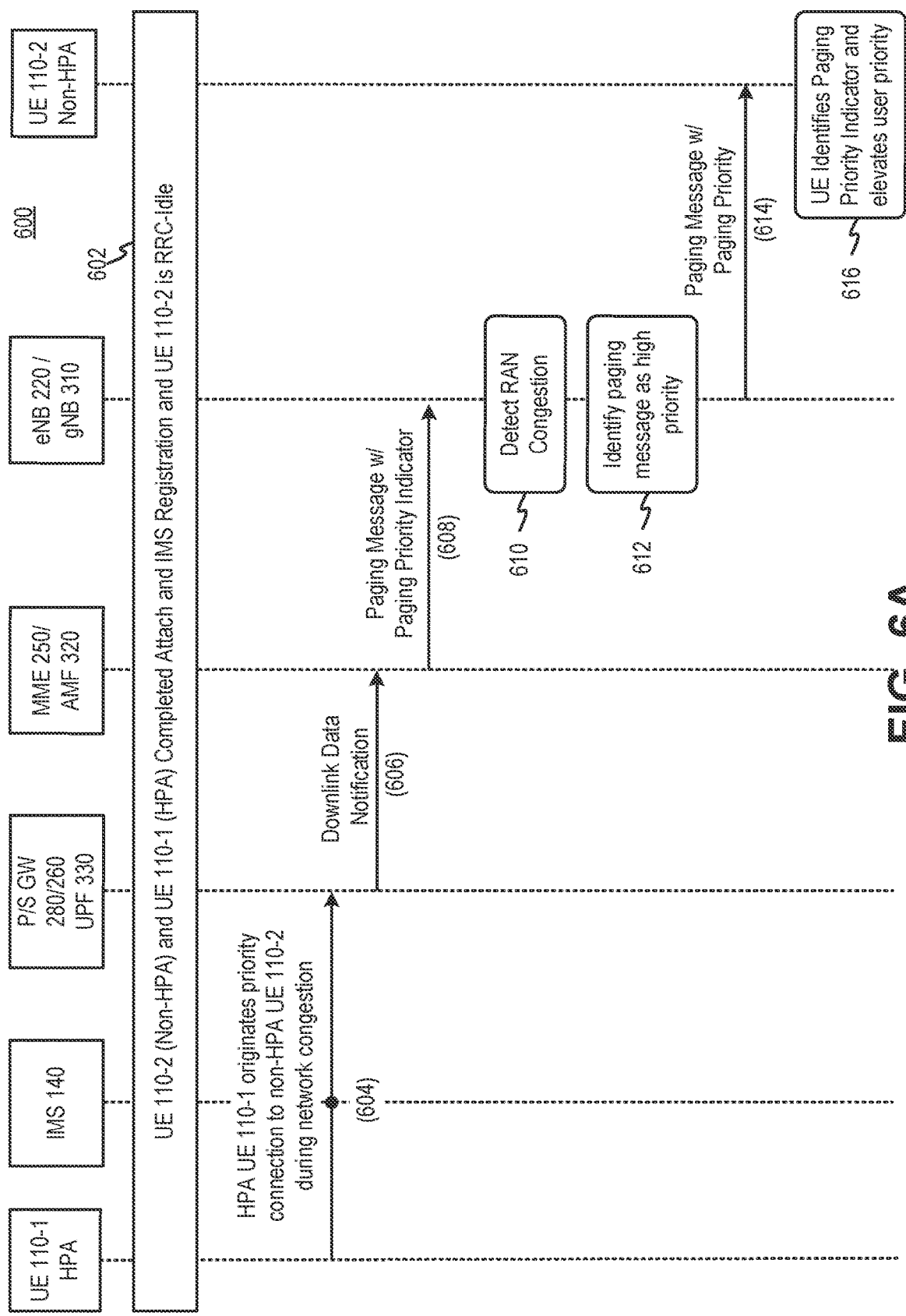
FIGS. 6A-6B are diagrams showing exemplary message flows within a wireless communication system for a terminating non-HPA UE device in RRC-idle mode to receive temporary admission priority.
Figure 6B:
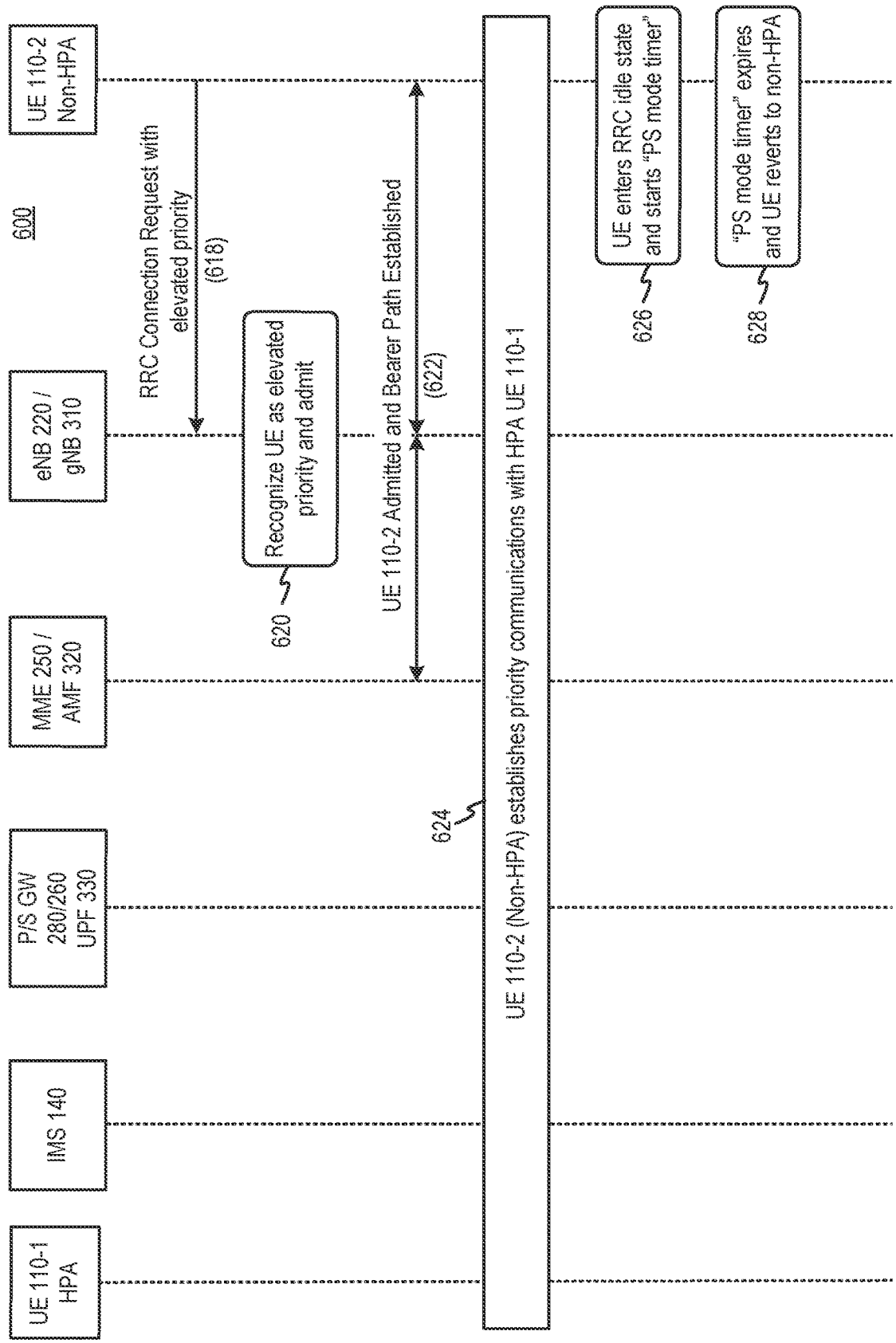

FIGS. 6A-6B are diagrams showing exemplary message flows within a wireless communication system 200 and/or 300 for providing temporary RAN admission priority of paged non-HPA UE devices based on an originating MPS service. The message flow diagrams show network components which may correspond to both LTE and 5G network standards. As noted above, the LTE components are shown with the label "2XX" and the 5G components are shown with the label "3XX." For example, as shown in FIGS. 6A-6B, the base station elements are shown as "eNB 220/gNB 310," the mobility managers are shown as "MME 250/AMF 320," etc. FIGS. 6A-6B provide simplified illustrations of communications and are not intended to reflect every signal or communication exchanged between devices/functions.

In FIG. 6A, flow diagram 600 initially shows UE device 110-1 and UE device 110-2 as having completed an attachment and registration procedure, and both are in an RRC-idle state (602). In the embodiment shown in FIG. 6A, UE device 110-2 is associated with a non-HPA status (i.e., a non-elevated or "normal" priority status), and UE device 110-1 is associated with an HPA status (i.e., an elevated priority status). UE device 110-1 may originate a priority connection to UE device 110-2 during a period of congestion on the RAN (604). A priority connection request is sent from UE device 110-1 to PGW 280/SGW 260 or UPF 330. The connection request may be provided via IMS 140. PGW 280/SGW 260 or UPF 330 may then send a downlink data notification to MME 250 or AMF 320 (606). The downlink data notification may also include a message or signal for a high priority allocation and retention priority (ARP) status. MME 250/AMF 320 may generate and send to eNB 220/gNB 310 a paging message with a paging priority indicator (e.g., an information element indicating an elevated priority), and a Temporary Mobile Subscriber Identity (e.g., m-TMSI) value indicating the identity of UE device 110-2 (608). Upon receiving the paging message (608), eNB 220/gNB 310 may detect RAN congestion (610), and identify the paging message as having a high priority status (612). ENB 220/gNB 310 may send a paging message, along with a paging priority, via RAN 115, to UE device 110-2 (614). In an embodiment, the paging priority may be indicated as a parameter in the paging message having a 1-bit value.

UE device 110-2 may receive the paging message with the paging priority. Since the terminating user is a non-HPA subscriber, UE device 110-2 does not have an elevated priority indicator, such as the 5G Access Identity (AI) of 1-2, 11-15 or, in LTE, the Special Access Class 11-15. Therefore, UE device 110-2 may identify the paging priority indicator and elevate the user priority (616).

Referring to FIG. 6B, subsequently, UE device 110-2 may provide to eNB 220/gNB 310 an RRC connection request having an elevated priority status (e.g., HPA) (618). eNB 220/gNB 310 may recognize the UE device 110-2 as having elevated priority, based upon the parameter in the RRC connection request, and admit UE device 110-2 as a priority user (620). UE device 110-2 may then be admitted to RAN 115, and a bearer path can be established (622). UE device 110-2 may then establish priority communications with UE device 110-1 (624).

When the session between UE device 110-2 and UE device 110-1 ends, UE device 110-2 may eventually transition to RRC idle state, and start a PS mode timer (626). When the PS mode timer expires, UE device 110-2 may revert back to the original (non-HPA subscriber) status, thereby exiting the elevated (e.g., HPA) mode (628).

Figure 7:
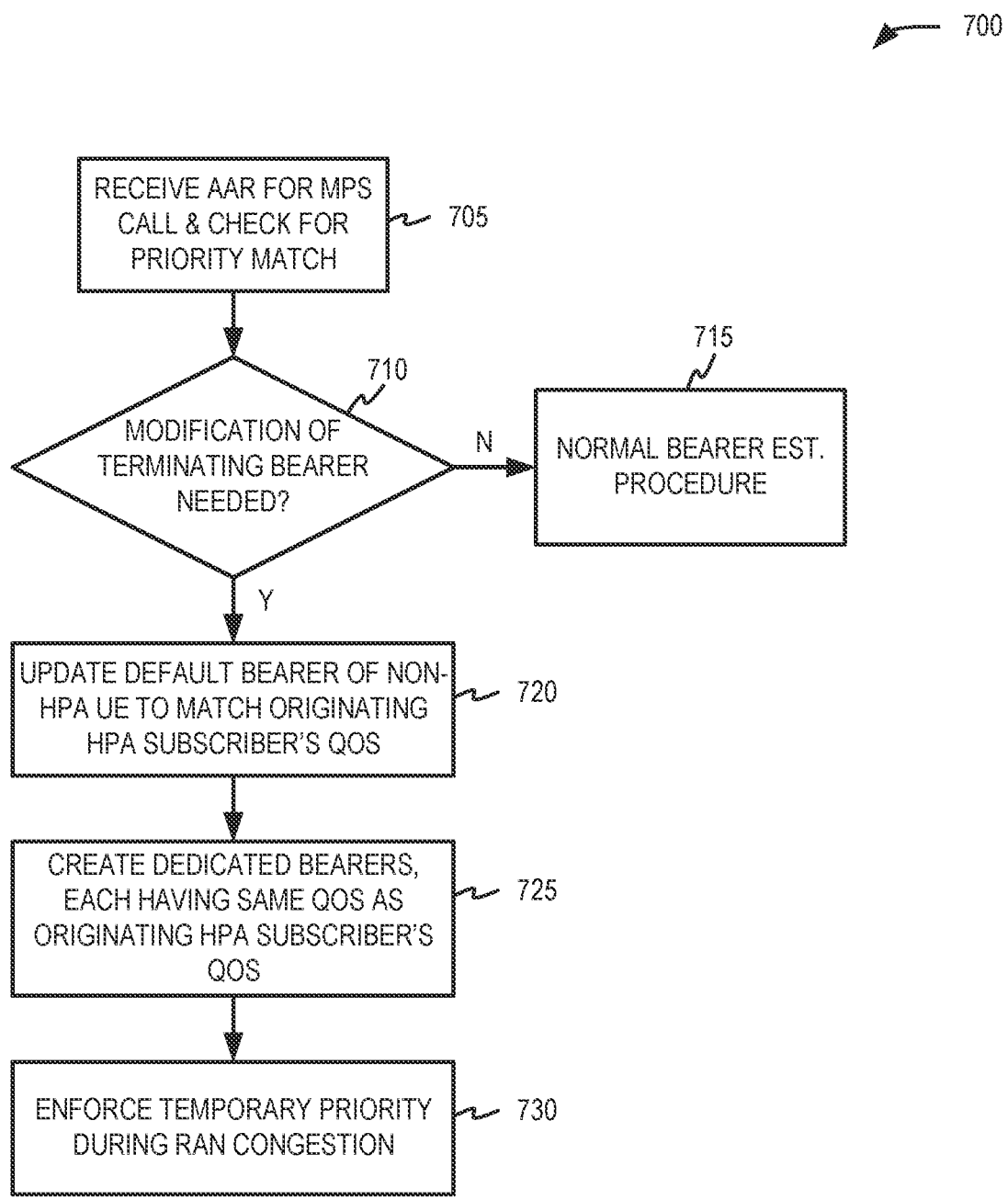
FIG. 7 is a flow chart of an exemplary process for a terminating non-HPA UE device in RRC-connected mode to receive temporary admission priority.

FIG. 7 is a flow chart of an exemplary process 700 for a non-HPA RRC-connected UE device to receive a temporary RAN admission priority. In an embodiment, process 700 may be performed by one or more devices in CN 130, such as PCRF 290. In other embodiments process 700 may be performed by UE device 110-2 in conjunction with one or more devices 400 in CN 130 and RAN 115.

Process 700 may include receiving an Authentication Authorization Request (AAR) for an MPS call and checking for a priority match (block 705). For example, UE device 110-1 (e.g., an HPA subscriber) and UE device 110-2 (e.g., a non-HPA subscriber) may be attached and IMS-registered in wireless communication system 100. Assume both UE device 110-1 and UE device 110-2 are in RRC-connected mode, and hence have an active RRC connection. UE device 110-1 may originate an MPS session (e.g., a Voice over LTE (VoLTE) call using a designated emergency extension, such a "*272"). As part of the call setup, PCRF 290/PCF 354 may receive an AAR. In response to the AAR, PCRF 290/PCF 354 may check the MPS-ID, the Reservation Priority, and/or other priority markings from the AAR to determine if there is a need for a bearer update procedure for the terminating user default bearer (e.g., for UE device 110-2).

Process 700 may also include determining if modification of the terminating bearer is needed (block 710). For example, PCRF 290/PCF 354 may refer to the profile of UE device 110-2 to identify if the terminating (or called) UE device 110-2 is an HPA subscriber. The default bearer for a non-HPA subscriber could be subject to preemption during an ongoing call in the event of RAN congestion, and, therefore, would require modification. Conversely, if the terminating (or called) UE device was found to already be an HPA subscriber no bearer modification would be needed.

If modification of the terminating bearer is not needed (block 710—no), process 700 may include performing a normal bearer establishment procedure (block 715). For example, if the called UE device is an HPA subscriber, PCRF 290/PCF 354 may proceed with conventional procedures to initiate a default bearer for the MPS session.

If modification of the terminating bearer is needed (block 710—yes), process 700 may include updating a default bearer for the non-HPA UE device to match the originating HPA subscriber's QoS (block 720). For example, core network components for UE device 110-2 may use the originating MPS user bearer QoS parameters (e.g., including an ARP indicator and/or another high priority parameter) and the associated m-TMSI of the terminating non-HPA user (UE device 110-2) to target the terminating default bearer for elevated priority.

Process 700 may further include creating dedicated bearers, each having same QoS as the originating HPA subscriber's QoS (block 725), and enforcing temporary priority during RAN congestion (block 730). For example, using the default bearing with elevated priority, both UE device 110-2 and UE device 110-1 may establish dedicated bearers with the originating subscriber's MPS QoS. Base station 120 (e.g., eNB 220 or gNB 310) may observe the m-TMSI or other UE-identity for UE device 110-2 and temporarily elevate the non-HPA UE device 110-2 to provide HPA treatment along with MPS bearer level QoS. In the event of RAN congestion during the ongoing session between UE device 110-1 and UE device 110-2, the end-to-end session would be treated with high priority to minimize the possibility of preemption.

FIG. 8A-8D are diagrams showing exemplary message flows within a wireless communication system 200 and/or 300 for providing temporary RAN admission priority to connected non-HPA UE devices based on an originating MPS service. Similar to flow diagrams of FIG. 6A-6B, the message flow diagrams in FIGS. 8A-8D show network components which may correspond to both LTE and 5G network standards.

Figure 8A:
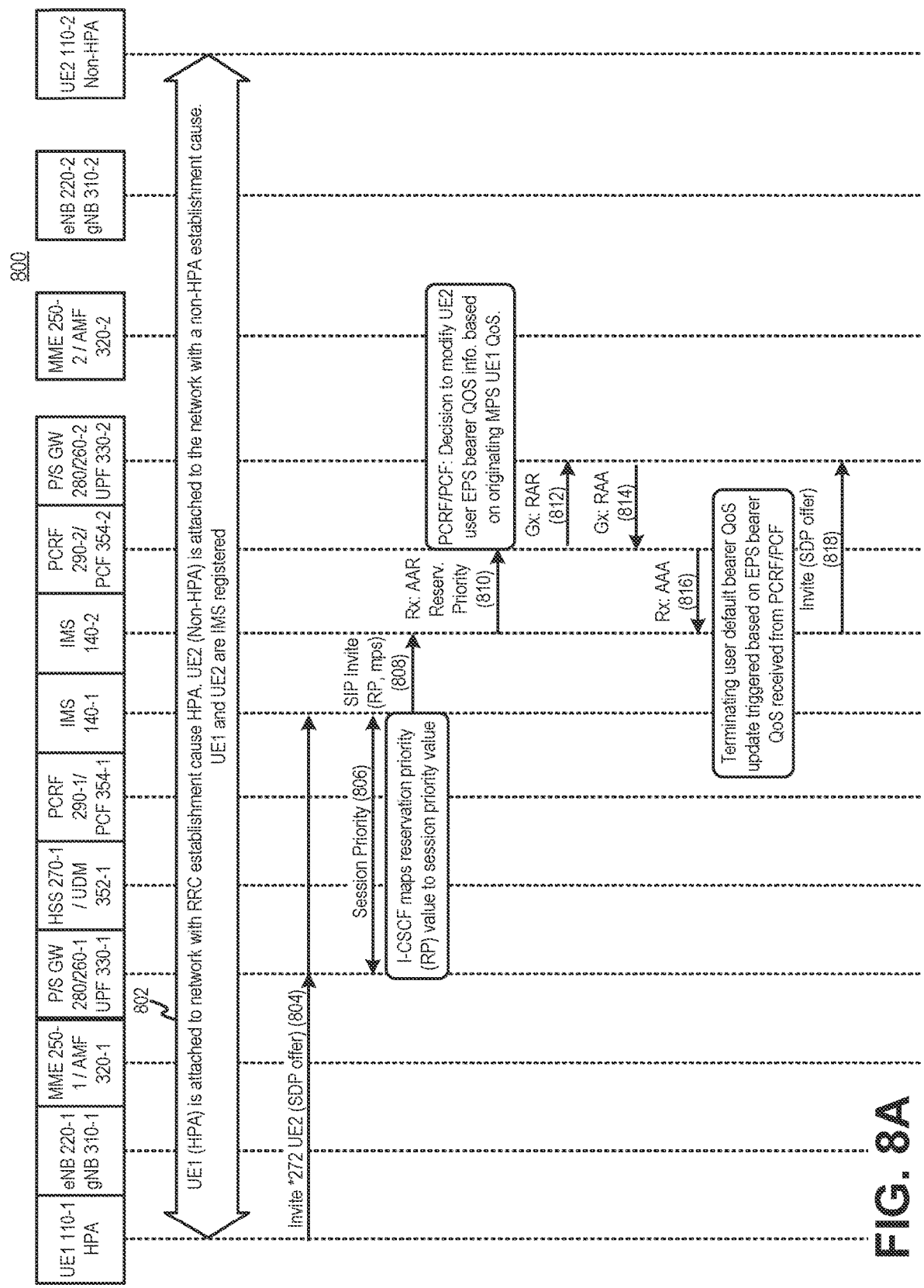
Figure 8B:
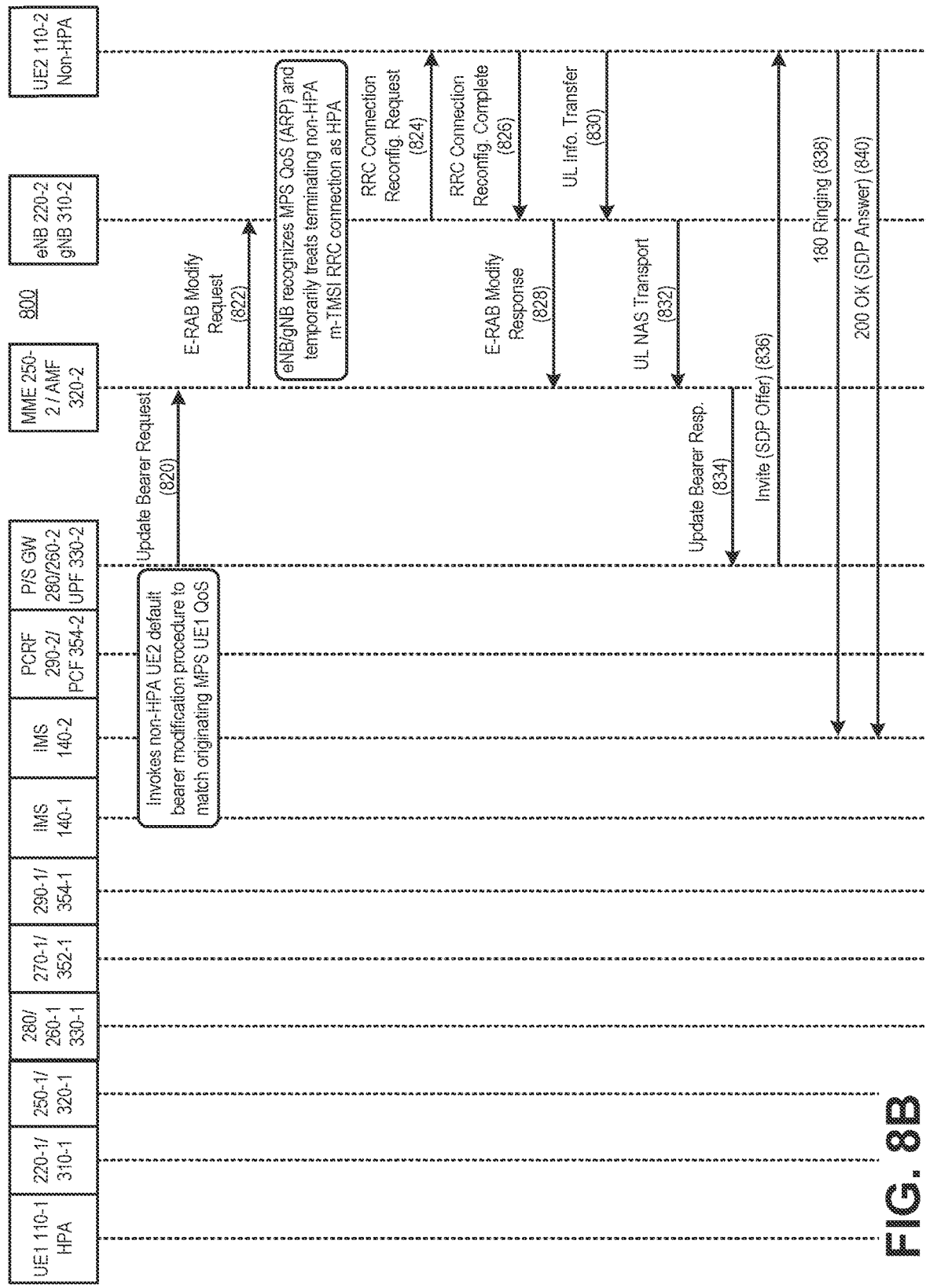
Figure 8C:
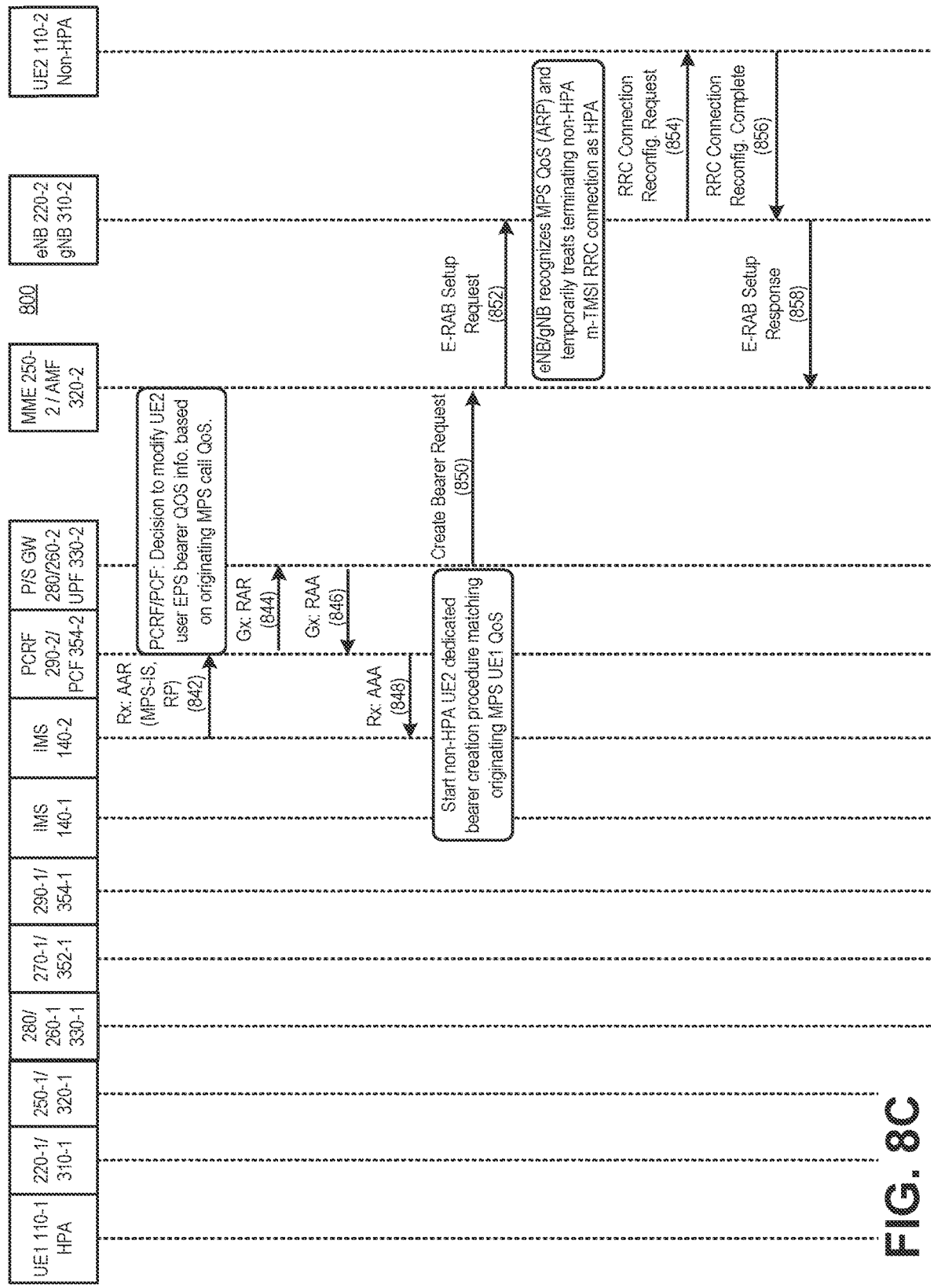

FIGS. 8A-8D provide simplified illustrations of communications and are not intended to reflect every signal or communication exchanged between devices/functions. Particularly, FIGS. 8A-8D show terminating side bearer establishment for non-HPA UE device 110-2. Messages for originating side bearer establishment for HPA UE device 110-1 are not shown, but may occur essentially in parallel with the communications of FIGS. 8A-8D. FIGS. 8A-8B show communications to establish a default bearer, and FIG. 8C-8D show communications to establish a dedicated bearer. The default beater may be used to exchange control messages between UE devices 110-1 and 110-2. Once the call is setup, media of the call may be transferred through the dedicated bearer.

In FIG. 8A, flow diagram 800 initially shows UE device 110-1 and UE device 110-2 as having completed attachment and IMS registration procedures, with both in an RRC connected state (802). In the embodiment shown in FIG. 8A, UE device 110-1 (e.g., an HPA subscriber) may originate an MPS session (e.g., a VoLTE call) via a SIP invite message (804) that includes a Session Description Protocol (SDP) offer. The SIP invite and SDP offer may include, for example, a list of preferred codecs settings. SIP invite message (804) may cause signaling at 806-810 to eventually trigger a Call Session Control Function (CSCF) in IMS 140-2 to send a an Authentication Authorization Request (AAR) over a Diameter Rx interface to PCRF 290-2/PCF 354-2.

In response to the AAR, PCRF 290-2/PCF 354-2 may then perform session binding, to associate the session over an Rx interface with the session over a Gx interface, and may install the appropriate policies over the Gx session by returning an AA Answer (AAA) to P-CSCF 295. For example, as further shown in FIG. 8A, PCRF 290-2/PCF 354-2 checks the MPS-ID, Reservation Priority (RP), and other priority parameters (e.g., QCI, ARP, preemption capability information (PCI), preemption vulnerability information (PVI)), etc.) which may trigger a bearer update procedure for the terminating user (e.g., UE device 110-2) default bearer. More particularly, PCRF 290-2/PCF 354-2 may send a re-authorization request (RAR) (812) to a gateway (e.g., PGW 280-2, SGW 260-2, UPF 330-2) and receive a re-authorization answer (RAA) (814) to compare default bearer parameters for UE device 110-2 against the high priority parameters and/or QoS parameters of the bearer for UE device 110-1. Assuming the priority levels for the terminating default bearer are lower than those of the originating MPS bearer, PCRF 290-2/PCF 354-2 may provide an Authentication Authorization Answer (AAA) (816) to IMS 140-2 with QoS parameters that triggers an EPS bearer QoS update. IMS 140-2 may provide a SIP invite (818) to the gateway (e.g., PGW 280-2, SGW 260-2, UPF 330-2) to invoke a default bearer modification procedure to match the originating HPA subscriber's QoS.

Referring to FIG. 8B, the default bearer modification procedure may begin with the gateway (e.g., PGW 280-2, SGW 260-2, UPF 330-2) providing an update bearer request (820) to MME 250-2/AMF 320-2. The update bearer request may include the same QoS parameters as for the MPS bearer for UE device 110-1. MME 250-2/AMF 320-2 may send an Evolved-UMTS Terrestrial Radio Access Network (E-UTRAN) Radio Access Bearer (E-RAB) modify request message (822) containing the originating MPS user bearer QoS demands and the associated m-TMSI of the terminating non-HPA user (e.g., UE device 110-2). For example, the E-RAB modify request message may include a high priority ARP status for the bearer.

The eNB or gNB serving UE device 110-2 (e.g., eNB 220-2/gNB 310-2) may receive the E-RAB modify request message, identify the ARP, and temporarily treat the terminating non-HPA m-TMSI RRC connection as an HPA connection. For example, eNB 220-2/gNB 310-2 may send a RRC Connection Reconfiguration request message (824) to UE device 110-2 to establish an HPA bearer for the m-TMSI RRC connection. UE device 110-2 may respond with a RRC Connection Reconfiguration complete message (826). The RRC Connection Reconfiguration complete message may be received by eNB 220-2/gNB 310-2, which, in turn, may provide am E-RAB modify response (828) to MME 250-2/AMF 320-2.

In subsequent signals (830-834), as illustrated, various complete, transfer, and response messages may be generated and transmitted that are responsive to the request messages previously described. After the terminating user (e.g., UE device 110-2) RRC connection and bearer treatment has been elevated to the originating MPS user priority, the signaling path for the default bearer may be established.

IMS 140-2 may provide a SIP invite (836) with SDP offer to UE device 110-2. UE device 110-2 may provide a SIP "180 ringing" message (838) to IMS 140-2 and alert the user of UE device 110-2 of the incoming call. UE device 110-2 may provide an SDP answer (SIP 200 OK) message (840) to IMS 140-2 when the user accepts the call.

When the SDP answer (840) arrives to the terminating P-CSCF 295 node in IMS 140-2, dedicated bearers may be created. Signals to create the dedicated bearer for the terminating UE device 110-2 are shown in FIGS. 8C-8D. Signals 842-864 follow a similar pattern to signals 810-834 as described above. Features of the dedicated bearer creation process include for UE device 110-2 to receive the same MPS priority as UE device 110-1 for the duration of the session, the gateway (e.g., PGW 280-2, SGW 260-2, UPF 330-2) triggers creation of the dedicated bearers (850) with the originating UE device 110-1 MPS QoS. The eNB or gNB serving UE device 110-2 (e.g., eNB 220-2/gNB 310-2) may receive E-RAB setup request message 852, observes the m-TMSI or other UE-identity, and temporarily elevate the terminating non-HPA UE device 110-2 to provide HPA treatment along with MPS bearer level QoS (854, 856).

Figure 9:
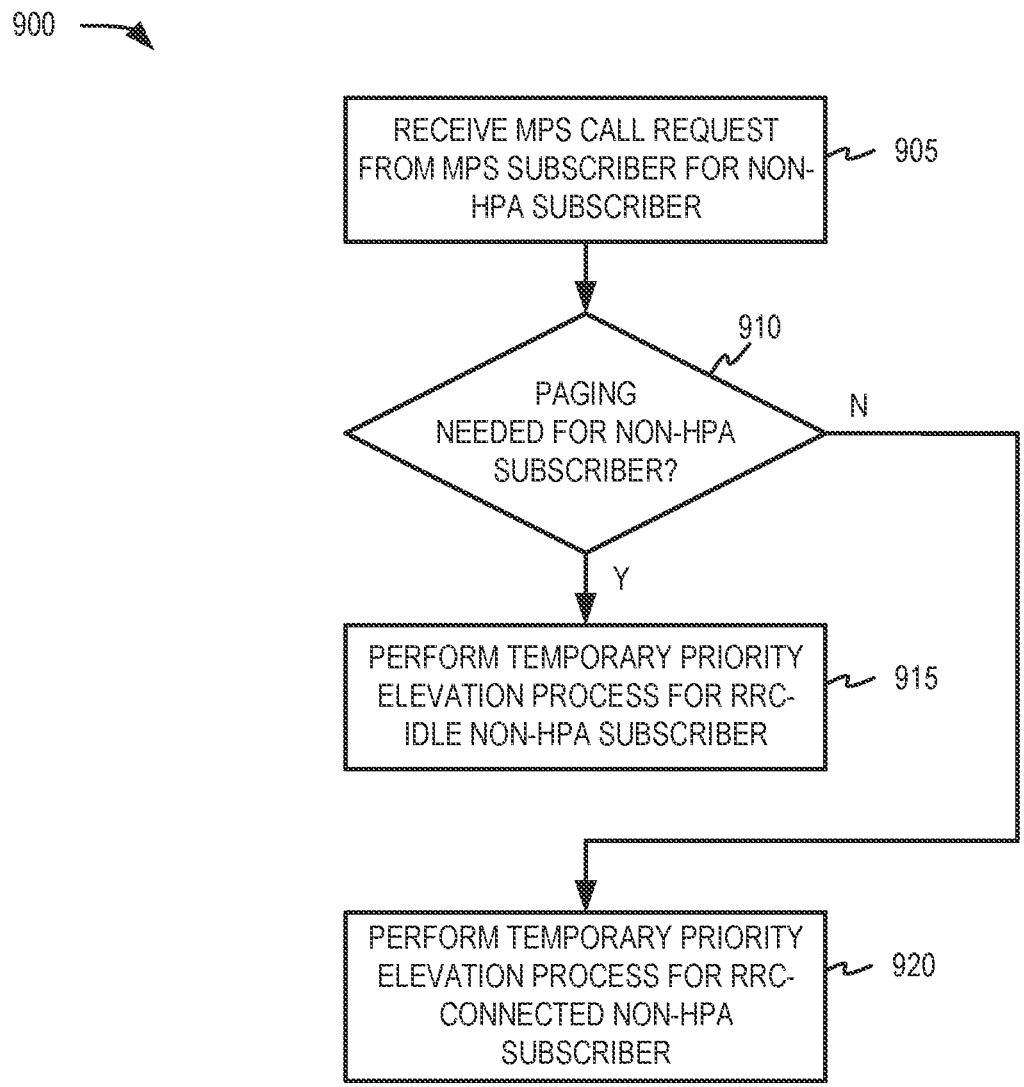
FIG. 9 is a flow chart of an exemplary process for managing wireless multimedia priority service (MPS) sessions terminating to non-HPA subscribers, according to an implementation described herein.

Upon receiving a create bearer response (860), the gateway (e.g., PGW 280-2, SGW 260-2, UPF 330-2) and PCRF 290-2/PCF 354-2 may exchange credit control messages, such as a credit control request (CCR) (866) and a credit control answer (CCA) (870). PCRF 290-2/PCF 354-2 may send a RAR (868) to IMS 140-2 and receive a RAA from IMS 140-2 (872). With the dedicated bearer and default bearer established, IMS 140-2 may provide an SDP answer (SIP 200 OK) message (874) to IMS 140-1 in response to invite 808 (FIG. 8A). When similar bearers are established for originating UE device 110-1, system 100 may establish and maintain end-to-end priority of the MPS session terminating to a non-HPA subscriber, and preclude preemption of UE device 110-2 (or the MPS session) during periods of network congestion FIG. 9 is a flow chart of an exemplary process 900 for managing wireless MPS sessions terminating to non-HPA subscribers. In an embodiment process 900 may be performed by UE device 110-2 in conjunction with devices 400 in RAN 115, CN 130, and IMS 140.

Process 900 may include receive an MPS call request from an HPA subscriber intended for a non-HPA subscriber (block 905), and determining if paging is needed for the non-HPA subscriber (block 910). For example, UE device 110-1 (e.g., an HPA subscriber) may initiate a MPS call to UE device 110-2 (e.g., a non-HPA subscriber). A device in CN 130 (e.g., MME 250/AMF 320) may determine if UE device 110-2 is in an RRC idle mode and requires a paging message.

If paging is needed for the non-HPA subscriber (block 910—yes), process 900 may further include performing a temporary priority elevation process for a RRC-idle non-HPA subscriber (block 915). For example, as described in connection with FIGS. 5, 6A, and 6B, if UE device 110-2 is in an idle mode, BS 120 and UE device 110-2 may implement a process for a non-HPA RRC-idle UE device to receive a temporary RAN admission priority during wireless network congestion.

If paging is not needed for the non-HPA subscriber (block 910—no), process 900 may further include performing a temporary priority elevation process for a RRC-connected non-HPA subscriber (block 920). For example, UE device 110-1 may be attached to network with RRC establishment cause HPA, and UE device 110-2 may be attached to the network with a non-HPA establishment cause (and both UE device 110-1 and UE device 110-2 are IMS-registered). As described in connection with FIGS. 7 and 8A-8D, in response to a call invite from IMS 140, devices in CN 130 (e.g. PCRF 290/PCF 354) may initiate a process for a non-HPA RRC-connected UE device to receive a temporary RAN admission priority during wireless network congestion.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 5, 7, and 9, and message flows with regard to FIGS. 6A-6B and 8A-8D the order of the blocks and message may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving, by a network device in a wireless network, a request for an elevated end-to-end priority session between a first user equipment (UE) device of a high-priority access (HPA) subscriber and a second UE device of a non-HPA subscriber, wherein the request originates from the first UE device in a Radio Resource Control (RRC) connected mode, with an originating bearer having an elevated priority status;
   determining, by the network device and in response to the receiving, that the second UE device is in an RRC connected mode with a terminating bearer having a non-elevated priority status;
   identifying, by the network device, a high priority parameter of the originating bearer for the first UE device;
   initiating, by the network device and in response to the receiving, modification of the terminating bearer to match the high priority parameter of the originating bearer for the end-to-end priority session, wherein the initiating includes sending, to the second UE device of the non-HPA subscriber, a RRC connection reconfiguration request message to establish the elevated priority status for the terminating bearer; and
   enforcing, by the network device, the high priority parameter on the terminating bearer for a duration of the end-to-end priority session between the first UE device and the second UE device.

2. The method of claim 1, further comprising:
   reverting, after the end-to-end priority session, the second UE device to the non-elevated priority status.

3. The method of claim 1, wherein modification of the terminating bearer further comprises:
   raising the status of the terminating bearer from a non-elevated priority level to an elevated priority level; and
   maintaining the elevated priority level of the terminating bearer for a duration of the end-to-end priority session between the first UE device and the second UE device.

4. The method of claim 1, wherein the network device incudes a Policy and Charging Rules Function (PCRF) or a Policy Control Function (PCF).

5. The method of claim 1, wherein the high priority parameter incudes a high priority allocation and retention priority (ARP) value.

6. The method of claim 1, further comprising:
   receiving, by a different network device in a radio access network, a paging message associated with the first UE device;
   providing, by the different network device, a paging message with an elevated paging priority to a third UE device, wherein the third UE device is in a RRC idle mode and has a non-elevated priority status; and
   establishing an RRC connection process with elevated priority for the third UE device.

7. The method of claim 3, further comprising:
maintaining, by the second UE device, an elevated priority level of the terminating bearer for a preset time after the second UE device enters an RRC idle state.

8. The method of claim 1, wherein the first UE device is associated with at least one of a multimedia priority service (MPS), a public safety service, a national security service, mission critical push to talk (MC-PTT) service, or an emergency preparedness service, and
wherein the second UE device is associated with a normal priority service.

9. The method of claim 1, wherein initiating modification of the terminating bearer includes:
initiating modification of a terminating default bearer; and
initiating setup of a terminating dedicated bearer.

10. A network device, comprising:
a processor configured to:
receive, in a wireless network, a request for an elevated end-to-end priority session between a first user equipment (UE) device of a high-priority access (HPA) subscriber and a second UE device of a non-HPA subscriber, wherein the request originates from the first UE device in a Radio Resource Control (RRC) connected mode, with an originating bearer having an elevated priority status;
determine, in response to receipt of the request, that the second UE device is in an RRC connected mode with a terminating bearer having a non-elevated priority status;
identify a high priority parameter of the originating bearer for the first UE device;
initiate, in response to the receipt of the request, modification of the terminating bearer to match the high priority parameter of the originating bearer for the end-to-end priority session, wherein the initiating includes sending, to the second UE device of the non-HPA subscriber, a RRC connection reconfiguration request message to establish the elevated priority status for the terminating bearer; and
enforce the high priority parameter on the terminating bearer for a duration of the end-to-end priority session between the first UE device and the second UE device.

11. The network device of claim 10, wherein the processor is further configured to:
revert, after the end-to-end priority session, the second UE device to the non-elevated priority status.

12. The network device of claim 10, wherein modification of the terminating bearer includes:
raising the status of the terminating bearer from a non-elevated priority level to an elevated priority level; and
maintaining the elevated priority level of the terminating bearer for a duration of the end-to-end priority session between the first UE device and the second UE device.

13. The network device of claim 10, wherein the network device incudes a Policy and Charging Rules Function (PCRF) or a Policy Control Function (PCF).

14. The network device of claim 10, wherein the high priority parameter incudes a high priority allocation and retention priority (ARP) value.

15. The network device of claim 10, wherein the first UE device is associated with at least one of a multimedia priority service (MPS), a public safety service, a national security service, mission critical push to talk (MC-PTT) service, or an emergency preparedness service, and
wherein the second UE device is associated with a normal priority service.

16. A non-transitory computer-readable medium comprising instructions, which, when executed by a processor, cause the processor to:
receive, in a wireless network, a request for an elevated end-to-end priority session between a first user equipment (UE) device of a high-priority access (HPA) subscriber and a second UE device of a non-HPA subscriber, wherein the request originates from the first UE device in a Radio Resource Control (RRC) connected mode, with an originating bearer having an elevated priority status;
determine, in response to receipt of the request, that the second UE device is in an RRC connected mode with a terminating bearer having a non-elevated priority status;
identify a high priority parameter of the originating bearer for the first UE device;
initiate, in response to the receipt of the request, modification of the terminating bearer to match the high priority parameter of the originating bearer for the end-to-end priority session, wherein the initiating includes sending, to the second UE device of the non-HPA subscriber, a RRC connection reconfiguration request message to establish the elevated priority status for the terminating bearer; and
enforce the high priority parameter on the terminating bearer for a duration of the end-to-end priority session between the first UE device and the second UE device.

17. The non-transitory computer-readable medium of claim 16, wherein the instructions further cause the processor to:
revert, after the end-to-end priority session, the second UE device to the non-elevated priority status.

18. The non-transitory computer-readable medium of claim 16, wherein modification of the terminating bearer includes:
raising the status of the terminating bearer from a non-elevated priority level to an elevated priority level; and
maintaining the elevated priority level of the terminating bearer for a duration of the end-to-end priority session between the first UE device and the second UE device.

19. The non-transitory computer-readable medium of claim 16, wherein the high priority parameter incudes a high priority allocation and retention priority (ARP) value.

20. The non-transitory computer-readable medium of claim 16, wherein the first UE device is associated with at least one of a multimedia priority service (MPS), a public safety service, a national security service, mission critical push to talk (MC-PTT) service, or an emergency preparedness service, and
wherein the second UE device is associated with a normal priority service.

* * * * *